Jan. 3, 1956  E. VAN DER PYL  2,729,542
SYNTHESIS OF SILICON CARBIDE
Filed Oct. 9, 1953
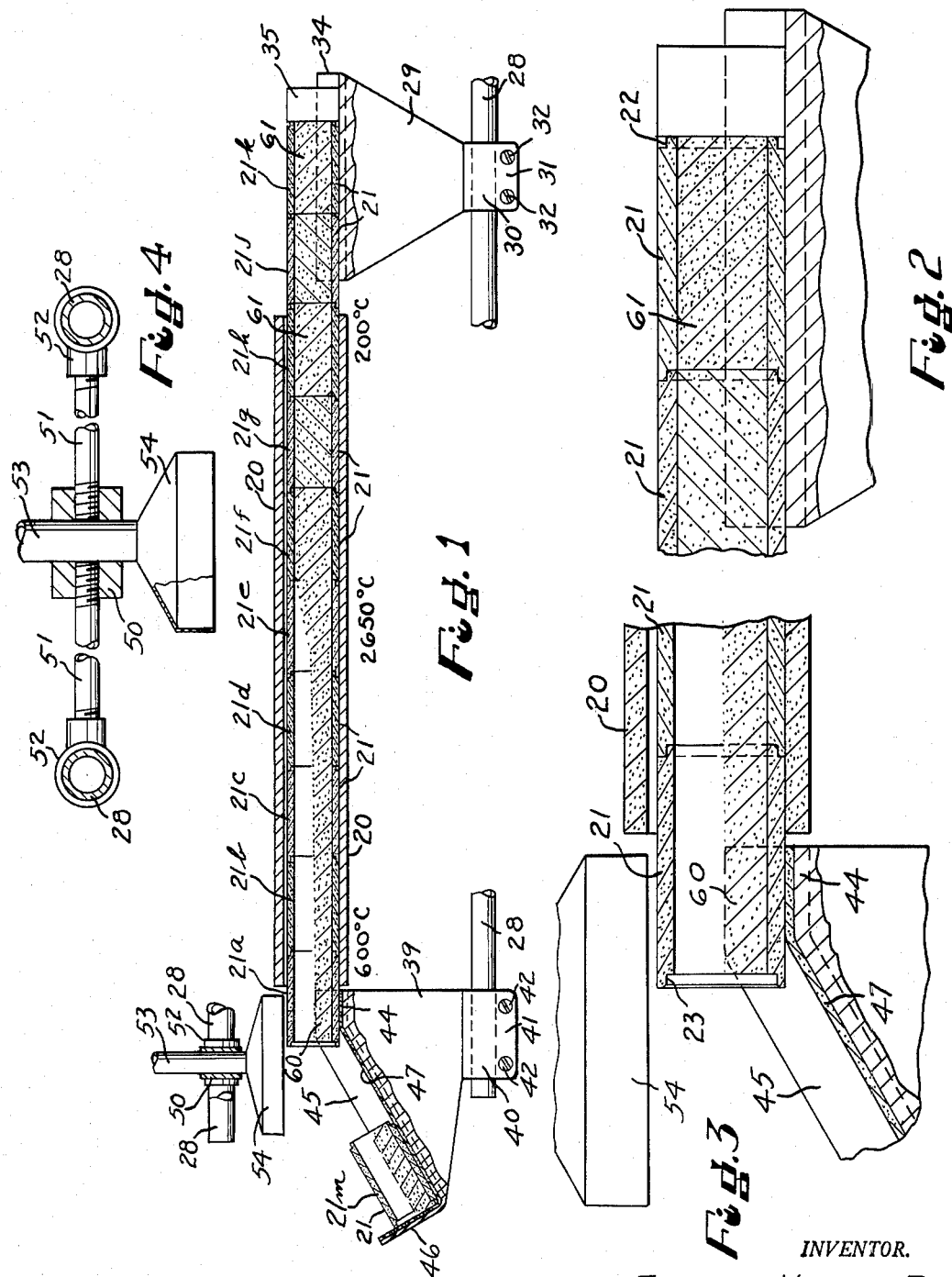
INVENTOR.
EDWARD VAN DER PYL
BY
ATTORNEY United States Patent Office 2,729,542
Patented Jan. 3, 1956

2,729,542

SYNTHESIS OF SILICON CARBIDE

Edward Van der Pyl, Holden, Mass., assignor to Norton Company, Worcester, Mass., a corporation of Massachusetts Application October 9, 1953, Serial No. 385,079

4 Claims. (Cl. 23—208)

The invention relates to the synthesis of silicon carbide.

One object of the invention is to synthesize silicon carbide in a continuous process whereby to reduce operating costs. Another object of the invention is to utilize the carbon dioxide produced by the synthesis of silicon carbide instead of allowing it to go to waste, thereby making a by-product available, still further to cut the operating costs. Another object of the invention is to provide a process for the production of silicon carbide in discrete crystals requiring only classification for the production of abrasive grain of the various sizes wanted for the manufacture of grinding wheels and other abrasive products, instead of, as heretofore, producing a massive pig of silicon carbide crystals grown together many of which crystals are too large for abrasive purposes, requiring costly crushing operations to produce the desired abrasive grain.

Another object of the invention is to produce silicon carbide for metallurgical uses at low cost. Another object of the invention is to make it possible to produce silicon carbide in a small building without the uncontrolled evolution of great amounts of noxious gas, without danger to personnel through volcanic eruptions and without filling the atmosphere with noxious gas and particles of silicon carbide to the detriment of the neighborhood in which the plant is located.

Another object of the invention is, in the course of producing the carbon dioxide, to utilize industrially the heat of the exothermic reaction in burning carbon monoxide. Another object of the invention is to utilize a readily available furnace for the synthesis of silicon carbide.

Other objects will be in part obvious or in part pointed out hereinafter.

The accompanying drawings show an illustrative embodiment of the apparatus which can be used to carry out the process of the invention, without illustrating the supports and the heating means which can be various. In these drawings, Figure 1 is a view partly in section and partly in elevation of the apparatus from end to end, on a small scale, Figure 2 is a sectional view on an enlarged scale of one end of the apparatus, Figure 3 is a sectional view on an enlarged scale of the other end of the apparatus, Figure 4 is an end elevation of a hood and its supports.

Illustrative of the practice of this invention, a tube furnace such as described in U. S. Letters Patent to R. R. Ridgway No. 2,125,588 can be used. Whereas in this patent the heating is accomplished by resistance, inductive heating can be substituted and, so far as the present invention is concerned, it is immaterial from what action or reaction the heat is derived so long as the features of the invention hereinafter set forth are maintained, of which an important one is the control of atmosphere. It is unnecessary, therefore, to illustrate herein the supports and the electrical connections of the Ridgway patent. The particular pressure apparatus shown in that patent is not at all involved herein so those elements of mechanism to achieve the pressure on the charge are to be deemed eliminated, and the structure of the Ridgway furnace is such that they can readily be removed with the greatest of ease without in any manner upsetting the apparatus for heating the tube which is a long graphite tube herein designated in the drawings by the numeral 20.

Referring now to Figure 1, the tube 20 contains a large number of tube sections 21 the ends of which are rabbeted with outside and inside rabbets 22 and 23 (see Figures 2 and 3) whereby the tube sections can be detachably joined to form a long tube inside of the tube 20 with the former, as illustrated, projecting beyond the ends of the latter. The tube sections 21 are likewise preferably made of graphite but, as in the case of the tube 20, amorphous carbon could be used. For many practical reasons, however, graphite is preferred.

Referring now to Figure 1, the lower structural steel tube 28 of the Ridgway patent is illustrated and this holds a support 29 having a bored boss 30 with a split portion 31 clamped by bolts 32 to grip the tube 28. The support 29 has a concave partially cylindrical tray 34 upon which a couple of the tube sections 21 rest. Also in the tray 34 is a graphite contact plug 35 blocking the right hand end of the right hand tube section 21.

Referring now to Figure 1, the steel tube 28 holds a support 39 extending through a bored boss 40 thereof, the bored boss 40 having a split portion 41 clamped by bolts 42. The upper part of the support 39 is formed as a tray 44 similar to the tray 43 but having a downwardly extending portion 45 at the end of which is a stop plate 46 which can be an integral part of the portion 45. The left hand end of the lower steel tube 28 of the Ridgway furnace is cut off to accommodate the portion 45. A refractory lining 47 for the tray 44 and the portion 45 as well as the stop plate 46 is preferably provided.

Referring to Figures 1 and 4, supported by the upper tubes 28 of the Ridgway patent by means of a collar 50, threaded pipes 51 and T-unions 52 on the tubes 28 is a pipe 53 on the bottom of which is formed a hood 54 for the collection of gas resulting from the reaction in the furnace. The pipes 51 and T-unions 52 as well as the tubes 28 function as supports and not to convey the gases or any fluid.

The reaction producing silicon carbide is, as is well known, expressed by the equation $$SiO_2 + 3C = SiC + 2CO$$

I provided a mixture which, making due allowance for the percentage of free carbon in the coke, roughly represented the proportions of the left hand side of this equation. This mixture is described in the following table:

Table I

|  | Pounds |
|---|---|
| Pitch coke | 240 |
| Quartz silica sand | 400 |
| Salt, NaCl | 8 |

The ingredients of Table I were thoroughly mixed and then pulverized in a ball mill to make fine particles which would just pass a 320 mesh screen.

I then took three of the tube sections 21 and packed them individually with the mixture of Table I. Up-ending a tube section, the mixture was poured slowly into it while tamping with a rod to compact the mixture. Because of the stickiness of the coke the mixture tamped very well and a tube section 21 could be packed so that, whether held vertically, horizontally or at a slant, the mixture would not fall out and the mixture at each end of the tube formed a plane bounding the end of the tube.

Of course the mixture must be kept from filling the inside rabbet 23.

To start the run I placed empty tube sections 21 in the positions indicated in Figure 1 by the tube sections identified as 21a, 21b, 21c, 21d, 21e, 21f and 21g. I filled three tube sections in the manner above described and placed these in the positions indicated by the sections marked 21h, 21j and 21k. Then I energized the furnace to heat the tube 20 until the center thereof was at 2650° C. With the center at 2650° C. the entrance end of the tube 20 in the Ridgway furnace is at about 200° C. while the exit end is at about 600° C. This furnace tube 20 was 60 inches long had a 6½ inch outside diameter and a 5¼ inch inside diameter. From these dimensions the size of the tube sections 21 can readily be judged.

After the tube 20 reached the desired temperature, measured by a pyrometer, I waited fifteen minutes, keeping the temperature constant, and then, having filled another tube section 21, I placed it on the tray 34 shoving all of the tube sections 21 the distance of one tube section whereupon one tube section, fell to the position indicated by the tube section 21m. Removing now this tube section that fell to the position 21m I filled it with mixture and fifteen minutes later placed it on the tray 34 and advanced all of the tube sections the distance of one tube section by pushing the plug 35. Except when momentarily moved to place a new section 21 in position, the graphite contact plug 35 was at all times in contact with the section in the position 21k. At all times the rabbets were in interlocking relation forming, out of the sections 21, a continuous tube not hermetically sealed but reasonably gas tight.

After the run had continued for a length of time sufficient to cause an originally filled tube section to reach the position 21a, the entire series of tube sections had solid material to the extent indicated in Figure 1 by the stippling.

Figure 1 shows the conditions when or after the first filled tube had reached the position 21m and the cross hatching of the mixture in Figure 1 shows that up to the position 21g the packings have not merged because the material has not yet reacted but starting with about the position 21f the material has reacted and there is no break between the material in one section and another. However, in the position 21a the material is substantially silicon carbide 60 whereas at the position 21h the material is substantially mixture 61. At intermediate positions the conditions are intermediate.

The silicon carbide which I produced as above described was at least 95% hexagonal type silicon carbide occurring as platy crystals built on small nodules of graphite. These crystals varied in size from small ones about 50 x 50 x 5 to 10 microns up to larger ones measuring approximately 500 x 500 x 50 microns. The amount of graphite was small, about 28%. This material is excellent for metallurgical uses in the iron and steel industries. It is also useful for certain abrasive purposes. Most of the graphite can readily be removed by milling and washing which would then make the material useful for the manufacture of grinding wheels.

By increasing the length of time between advances of the sections, I can produce larger crystals and eliminate most of the graphite. An increase in the proportion of sand will also reduce the amount of graphite in the final product. However, the product actually produced is definitely useful for the purposes indicated and the process has all the advantages pointed out in the objects.

It is preferred that the tube 20 and the tube sections 21 be made of carbon. The word carbon is used herein to cover both amorphous carbon and graphite. However, other materials might be used.

While I used a furnace heated to a temperature of 2650° C. as stated, the process can be carried out at lower temperatures if the time that the mixture is subjected to the top temperature is increased. Thus, assuming the material is at the hot spot for two hours, I might use a temperature as low as 1800° C. When operating at the lower temperatures it is important to make a thorough mixture of the ingredients and to have them finely divided.

The salt does not enter the equation and is not found in the silicon carbide formed since sodium chloride and its elements pass into gas at temperatures below 1800° C. The sodium chloride acts to flux some of the impurities in the mixture to cause them to volatilize more readily which is the reason for its use. The use of sodium chloride is entirely optional in my process.

The hood 54 catches the carbon monoxide evolved in the sections 21 and, because of the up-draft, draws in some air along with the carbon monoxide. At any convenient spot this combustible mixture of gases is ignited which yields heat to help pay for the process. Furthermore the result of the exothermic reaction or burning of the carbon monoxide is the formation of carbon dioxide. With suitable scrubbers, as is known in the art, the carbon dioxide can be removed from the nitrogen and any residual oxygen and then the carbon dioxide can be compressed and cooled to form solid carbon dioxide which is a valuable by-product resulting from practice of the invention. Herein lies one of the advantages of my process since in the open type resistance furnace it is impossible to collect the gases in any satisfactory manner.

It is vitally important that the reactants (coke or other source of carbon and silica) be placed within a continuous tube within the tube of the tube furnace. Any scheme of merely pushing the mixture through the tube furnace tube has insuperable disadvantages of which it suffices to point out that sticking of the synthesized SiC to the tube and erosion of the tube are sufficient to render the scheme impracticable. Any separation of the mixture into isolated compartments will not give satisfactory yields of hexagonal SiC for reasons I do not understand. Commercially the hexagonal SiC is far more useful than the cubic variety. I have found that, for continuous production of hexagonal SiC in a tube furnace it is imperative that an inner tube be formed out of sections joined together, but of course they have to be separable or else the process could not be continuous.

By tube I am not restricted to sections of circular cross section because the cross sections can be square, triangular, hexagonal or otherwise, but odd shapes such as star shapes would create trouble in removing the reacted charge and, mechanically, circular cross sections are simpler and from all points of view better so I prefer them.

In the claims the generic term carbon is used to refer to the pitch coke, which is essentially carbon, and the graphite material of the furnace tube and of the containers, because graphite is a form of carbon, and the furnace tube 20 as well as the containers 21 could be made of the other form of carbon viz. amorphous carbon.

It will thus be seen that there has been provided by this invention a process for the synthesis of silicon carbide in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. Process for the synthesis of silicon carbide comprising charging a mixture of carbon and silica into a plurality of open ended containers which are of a size and shape to be detachably joined at the open ends, mating a plurality of said containers and introducing them into a tube furnace having the shape of a long tube thereby forming a tube within the tube furnace which tube thereby formed constitutes a single compartment, advancing the containers through the tube furnace and removing the containers which have been advanced all the way through the tube furnace, said tube furnace being at a median location thereof heated to a temperature of at least 1800° C.

2. Process according to claim 1 in which the tube of the tube furnace is a carbon tube.

3. Process according to claim 2 in which the containers are carbon containers.

4. Process according to claim 1 in which the containers are carbon containers.

References Cited in the file of this patent

UNITED STATES PATENTS

| | | |
|---|---|---|
| 1,292,386 | Becket | Jan. 21, 1919 |
| 1,292,387 | Becket | Jan. 21, 1919 |
| 2,015,778 | Benner et al. | Oct. 1, 1935 |
| 2,178,773 | Benner et al. | Nov. 7, 1939 |

FOREIGN PATENTS

| | | |
|---|---|---|
| 550,133 | Great Britain | Dec. 24, 1942 |